United States Patent [19]

Schwartz et al.

[11] Patent Number: 4,566,818
[45] Date of Patent: Jan. 28, 1986

[54] LEDGER HANGER FOR GEODESIC DOMES

[75] Inventors: Victor M. Schwartz, Berkeley; Robert G. Miller, San Mateo, both of Calif.

[73] Assignee: Timberline Geodesics, Inc., Berkeley, Calif.

[21] Appl. No.: 519,385

[22] Filed: Aug. 1, 1983

[51] Int. Cl.⁴ .............................................. E04B 1/32
[52] U.S. Cl. ..................................... 403/172; 52/81; 403/175; 403/176; 403/232.1
[58] Field of Search ........................ 52/81, 648, 714; 403/172, 170, 171, 175, 176, 232.1, 233

[56] References Cited

U.S. PATENT DOCUMENTS

| | | | |
|---|---|---|---|
| 717,316 | 12/1902 | Avery | 403/232.1 |
| 2,583,474 | 1/1952 | Cozzone | 403/175 |
| 2,682,235 | 6/1954 | Fuller . | |
| 2,914,074 | 11/1959 | Fuller | 135/1 |
| 3,002,590 | 10/1961 | Hannoosh et al. . | |
| 3,105,969 | 10/1963 | Banche et al. | 52/81 |
| 3,114,176 | 12/1963 | Miller . | |
| 3,137,371 | 6/1964 | Nye . | |
| 3,186,522 | 6/1965 | McCauley . | |
| 3,192,669 | 7/1965 | Hawkins | 52/81 |
| 3,323,820 | 6/1967 | Braccini . | |
| 3,486,278 | 12/1969 | Woods | 52/81 |
| 3,635,509 | 1/1972 | Birkemler et al. . | |
| 3,810,342 | 5/1974 | Scott . | |
| 3,844,074 | 10/1974 | Ahern | 52/81 |
| 3,844,664 | 10/1974 | Hogan | 403/171 |
| 3,990,195 | 11/1976 | Gunther | 52/81 |
| 4,260,276 | 4/1981 | Phillips | 52/80 |
| 4,262,461 | 4/1981 | Johnson | 52/81 |
| 4,370,073 | 1/1983 | Ohme | 403/172 |
| 4,422,792 | 12/1983 | Gilb | 403/232.1 |

FOREIGN PATENT DOCUMENTS 155041  6/1956  Sweden .............................. 403/175

OTHER PUBLICATIONS

Timberline Geodesics, copyright 1981.
Louden Dairy Barn Fittings Plate 5 received Jun. 25, 1915.
Geodesics by Edard Popko ©1968 by U. of Detroit Press, Figs. 69–78.
Raumliche Tragwerke ans Stahl ©1963 by Verlay Stahleisen, pp. 33, 34, 60, 61, 141–143.

Primary Examiner—John E. Murtagh
Attorney, Agent, or Firm—James R. Cypher

[57] ABSTRACT

A ledger hanger for a geodesic dome having a seat and upstanding sidewalls connected to a spline which serves as a seat back and an adaptor connected to the spline. The adapter connects to a metal hub connector in the wall of the geodesic dome. A special pin securely attaches the ledger hanger to the structural metal hub in the wall. Ledger members are placed in the seats of the ledger hanger, bolted and form a secure partial or full ring around the inside perimeter of the dome at a second floor height.

2 Claims, 11 Drawing Figures

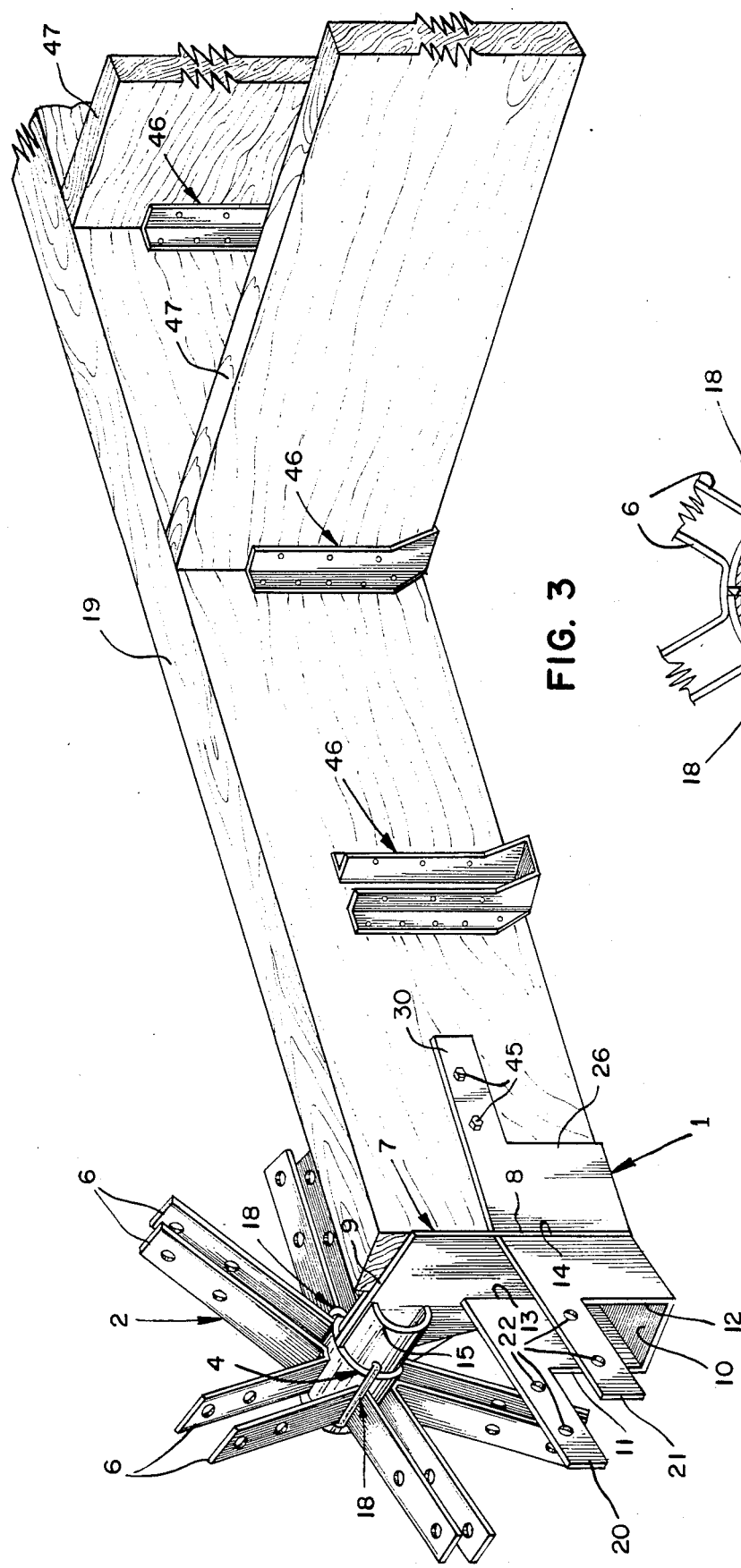
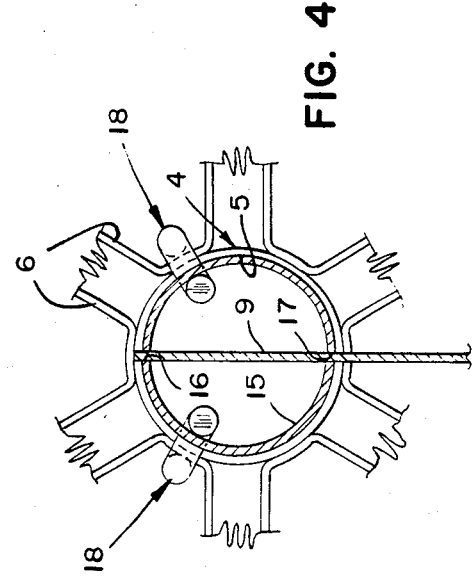
FIG. 3
FIG. 4

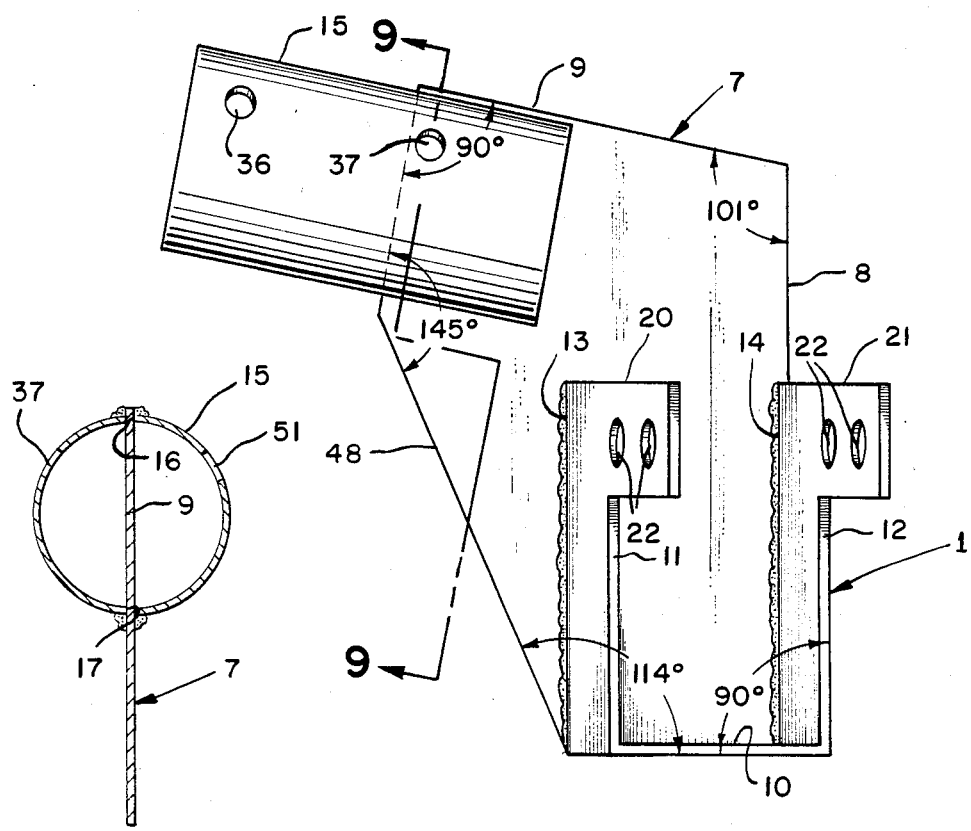
FIG. 9
FIG. 7
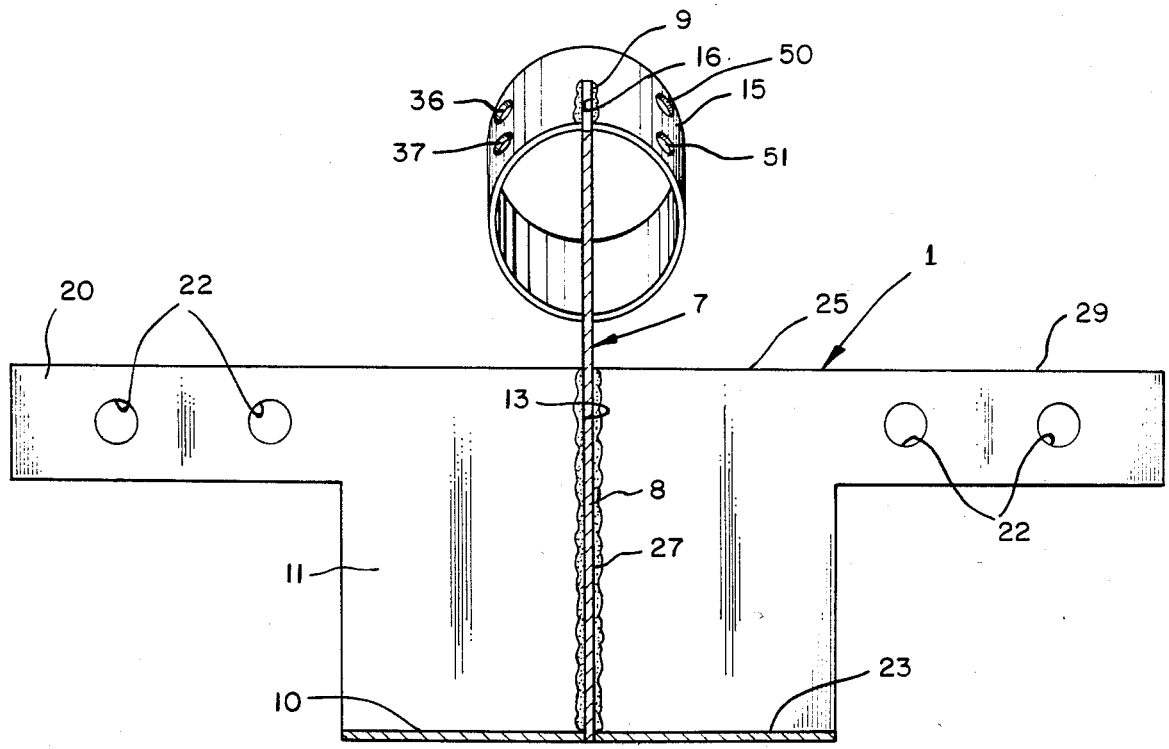
FIG. 8

LEDGER HANGER FOR GEODESIC DOMES

BACKGROUND OF THE INVENTION

During the 1920's Buckminster Fuller concluded that the building arts had not kept a pace with technological innovation. The result was the invention of the geodesic dome which many have concluded is the most efficient building design known. Fuller and others primarily worked with metal hubs and metal struts, but in relating the design to the private dwelling, the present day dome manufacturers have found that either an all wood frame or a metal hub and wood strut system offers the most efficient system.

While the geodesic domes provide spectacular large and open room areas, prior to the present invention, installing a second story within the dome shell meant a return to the ancient building system of post and beam construction. To support the second story, posts were placed within the dome and beams mounted on the posts carried the second floor joists. The posts destroyed the previous large unobstruced open areas.

Even though one of the well known characteristics of a geodesic dome is the strength and rigidity of the outer shell, Fuller as well as all those who worked with the geodesic principle failed to take advantage of the strong shell structure in supporting a second floor within the dome.

Workers in the conventional building arts have used metal hangers to support joist members from walls and ledger members since the late 1800's. Metal connectors, such as ledger hangers, however, have alluded those skilled in the geodesic dome art for over 60 years.

In short, in spite of the technological breakthrough of Fuller in the 1920's, a means to fully exploit this new technology alluded Fuller and all that followed, when it came to the problem of installing a second floor in a dome without cluttering the floor area with bearing walls and posts.

SUMMARY OF THE INVENTION

The gist of the present invention is the use of a metal ledger hanger which is connected to a metal hub in the outer wall of the geodesic dome. Preferably the hub is an integral part of the wall structure, serving as the hub for the wood struts in the outer wall.

An example of such a hub is shown in my U.S. Pat. No. 4,491,437, granted Jan. 1, 1985 and entitled CONNECTOR FOR GEODESIC DOME.

The ledger hanger supports a ledger member along the outer wall so that joist members may be supported at one end by standard metal joist hangers or the joist members may rest on top of the ledger member to provide a higher ceiling.

The ledger hanger is easy to install into the heavy duty hub connectors.

The wooden ledgers do not require any difficult shaping; they are simply cut to the right length and dropped into the hangers and secured with bolts.

With a perimeter ledger, it is not necessary to contend with post timbers that might interfere with door and window openings. Thus layout and design of floor plans is considerably simplified.

The ledger and hanger can be left exposed to enhance the beauty of a wood-grained ledger beam.

The ledger can span door and extension openings. Where the ledger extends around the entire perimeter, a tension ring is formed which greatly increases the strength of the dome.

BRIEF DESCRIPTION OF THE DRAWINGS

FIG. 3 is a perspective view of the ledger hanger connected to a hub connector and supporting a ledger. Portions of joist members supported on sheet metal joist hangers are connected to the ledger.

FIG. 4 is a cross section of a portion of the ledger hanger taken along line 4—4 of FIG. 2.

FIG. 7 is a side elevation view of the ledger hanger shown in FIG. 1.

FIG. 8 is a cross sectional view taken along line 8—8 of FIG. 5.

FIG. 9 is a cross sectional view taken along 9—9 of FIG. 7.

DESCRIPTION OF THE PREFERRED EMBODIMENTS OF THE INVENTION

Figure 1:
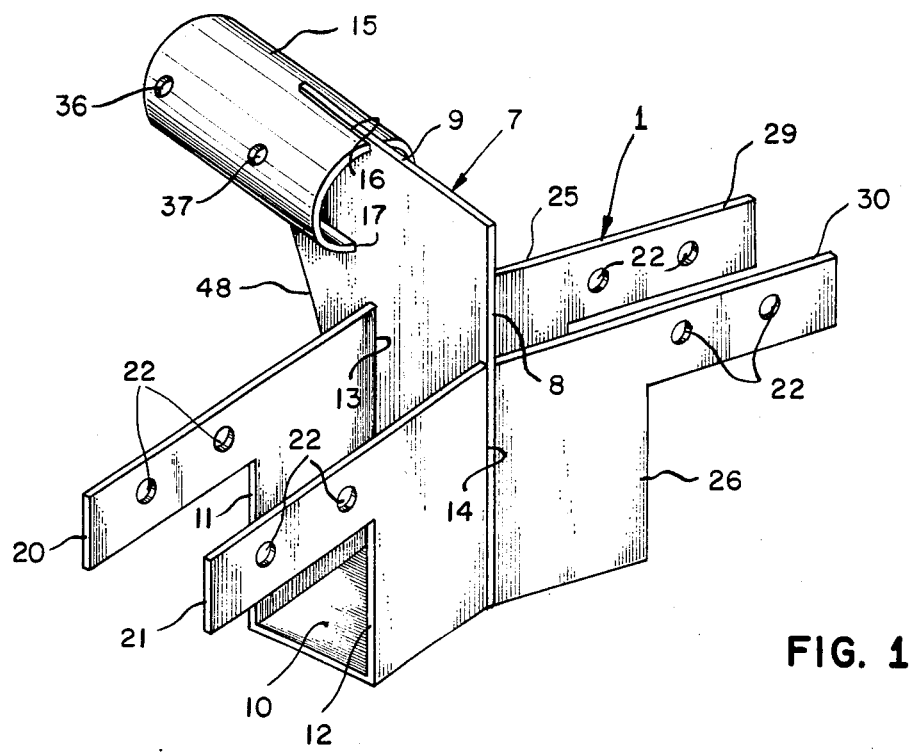
FIG. 1 is a perspective view of the ledger hanger of the present invention.

The ledger hanger 1 of the present invention is used in combination with a metal connector 2 for a geodesic dome 3. The metal connector 2 may be any connector which is formed with an elongated hub 4 having an elongated inner opening 5 and metal arms 6 attached to wood strut members which form the structural shell of the geodesic dome 3.

The ledger hanger 1 is formed with a spline or flange member 7 having a hanger supporting portion 8 and a hub connection portion 9. A first hanger seat 10 is connected to the hanger supporting portion of the spline and first hanger sidewall members 11 and 12 are connected to the seat and extend upwardly therefrom. The sides are connected to the spline as by welding along edges 13 and 14 to the spline member.

An adaptor member, here shown as a section of pipe 15 is connected to the hub connection portion of the spline member and is releasably connected to the elongated hub within the elongated inner opening of the hub. The tubular pipe section is preferably formed with slots 16 and 17 for receipt of the spline member and the two are connected by welding. The adaptor means may be square, hexagonal or any geometric configuration which gives the required strength to the connection and can slidably register with the inner walls of a hub member of the connector for the geodesic dome. It is not necessary that the adaptor member have a constant cross section, although a constant circular cross section is the preferred form. For example, if the connector hub has a truncated pyramid shape, the adaptor means would also be a truncated pyramid. The truncated pyramid would require stronger coupling means to hold the ledger hanger in place.

The means for coupling the adaptor member to the hub may be self locking due to the configuration of the two parts or it may be a simple pin 18 as shown in the drawings.

The ledgers 19 should be connected to the ledger hanger. As illustrated, first strap members 20 and 21 are connected to the first sidewall members 11 and 12 and extend outwardly therefrom. Bolt holes 22 are formed in the strap members for receiving bolts therethrough which hold the ledgers 19.

The ledger hangers with only one seat and one pair of sides are used for holding the end of a ledger where a door or window is to be installed or the second floor terminates. See ledger hanger 1', for example in FIG. 10. All other ledger hangers have a second hanger seat 23 as seen in ledger hangers 1 illustrated in FIGS. 1–9 and also shown in FIG. 10. The seat is connected to the opposite side of the spline from the first hanger seat and is disposed at an angle 24 thereto. The angle differs depending upon the size of the dome to be constructed. The second hanger sidewalls 25 and 26 extend from the second hanger seat and connect to the second seat and the spline members along welded edges 27 and 28.

Preferably, the second hanger sidewall members are formed with second strap members 29 and 30 and extend outwardly therefrom. Bolt holes 22 are formed therein for the receipt of bolts to attach the hanger to the wood ledgers.

Figure 2:
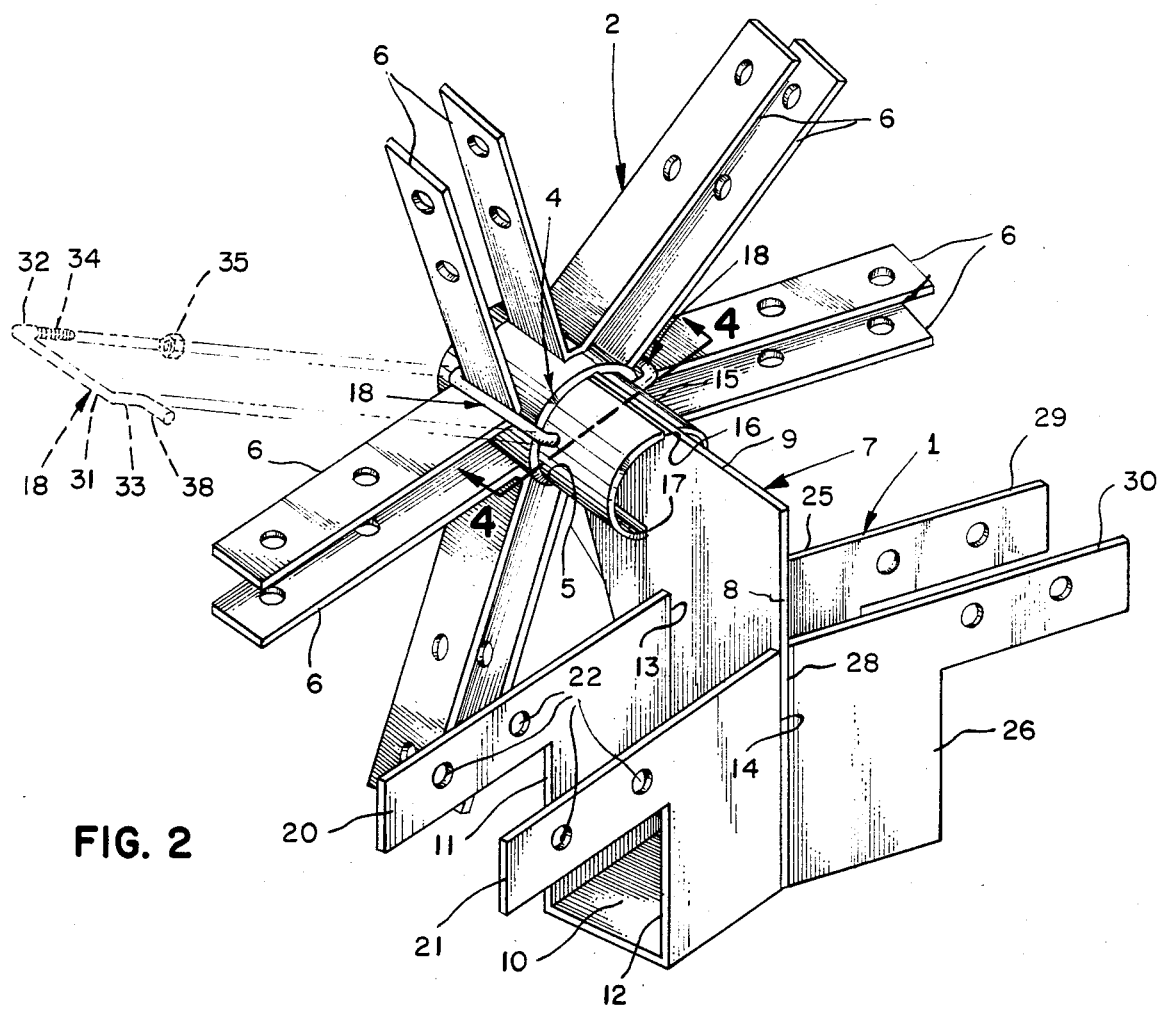
FIG. 2 is a perspective view of the ledger hanger of FIG. 1 connected to a hub connector.

Pin 18 could be a simple U-shaped member threaded at both ends with nuts to hold the pin in place. The preferred form, however, is shown in FIG. 2 and is formed with a substantially straight base member 31 and two angularly related parallel legs 32 and 33. Leg 32 is formed with threads 34 for the receipt of locking nut 35. The length of base member 31 is slightly greater than the length of hub 4. Legs 32 and 33 have a length sufficient to traverse pipe 15 and hub 4 and have sufficient threads protruding for the receipt of locking nut 35. Openings 36 and 37 in pipe 15 receive the ends of pin legs 32 and 33.

Preferably, pin 18 is formed with a tongue 38 on leg 33 which extends at substantially a right angle thereto.

Figure 10:
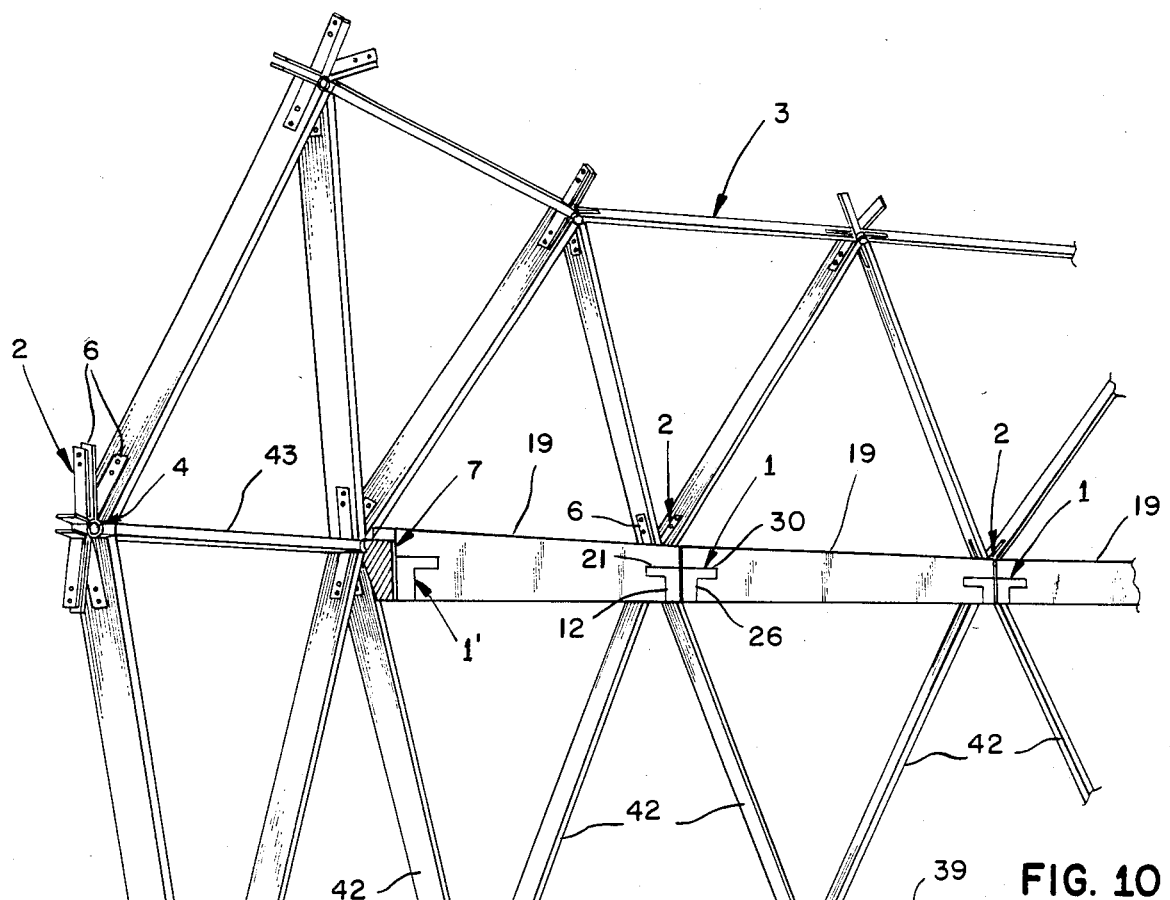
FIG. 10 is a perspective view of a portion of a geodesic dome with a plurality of ledger hangers supporting a plurality of ledgers.

The installation of the ledger hangers in a geodesic dome is as follows. Referring to FIG. 10, the base struts 39 are laid on the foundation and connected to base metal connectors 40. Upstanding struts 42 are connected to the base connectors 40 and to the metal connectors 2 at an elevation line on the dome where the centers of the hubs are level. Horizontal struts 43 are connected to metal connectors 2. The ledger hangers 1 are then attached to the metal connectors 2 by inserting pipe 15 into hub 4 until openings 36 and 37 straddle the ends of hub 4. The seats 10 and 23 are leveled and pin 18 is used to connect the ledger hanger to the metal connector 2 by inserting tongue 33 into opening 37 in pipe 15, turning the pin 90 degrees, straddling base member 31 over metal arms 6 and hub 4 and inserting leg 32 into hole 36. Locking nut 35 is threaded onto the threaded portion 34 of the pin and connection is complete. If an end ledger hanger 1' is used, the procedure is identical. Next, a ledger 19 is cut to span the distance between ledger hangers and is dropped into place between walls 11 and 12 and onto seat 10. The ledger should be cut to fit smugly against spline member 7. All of the ledger hangers and ledgers are placed in the same manner. The bolts 45 should be placed through openings 22 in the strap members to secure the ledgers 19 to the ledger hangers. Standard joist hangers 46 may be nailed to the ledger 19 and joist members 47 placed on the seats of the joist hangers. If a higher ceiling is desired, the joist hangers 46 may be eliminated and the joist members 47 placed on the top edge of the ledgers 19 which is also common practice in the industry.

The metal connectors 2 are available through Timberline Geodesics, Inc. of Berkeley, Calif. and the connector is fully described in my U.S. Pat. No. 4,491,437, granted Jan. 1, 1985. The ledger hangers of the present invention are particularly made for the metal hangers 2 which are illustrated and made by Timberline Geodesics, but as stated previously, pipe member 15 may be modified to interconnect with other metal connectors which have sufficient clearance to receive an adapter means such as pipe 15.

In placing holes 36 and 37 in pipe 15, it is to be understood that they must be positioned so that the pin 18 clears metal straps 6 in the connector 2.

The pin openings should also be placed so that the seats 10 and 23 of the ledger hanger will project sufficiently inwardly into the dome so that where there is inward curvature in the dome, the ledger member may have sufficient clearance to be set into the ledger hangers.

Figure 5:
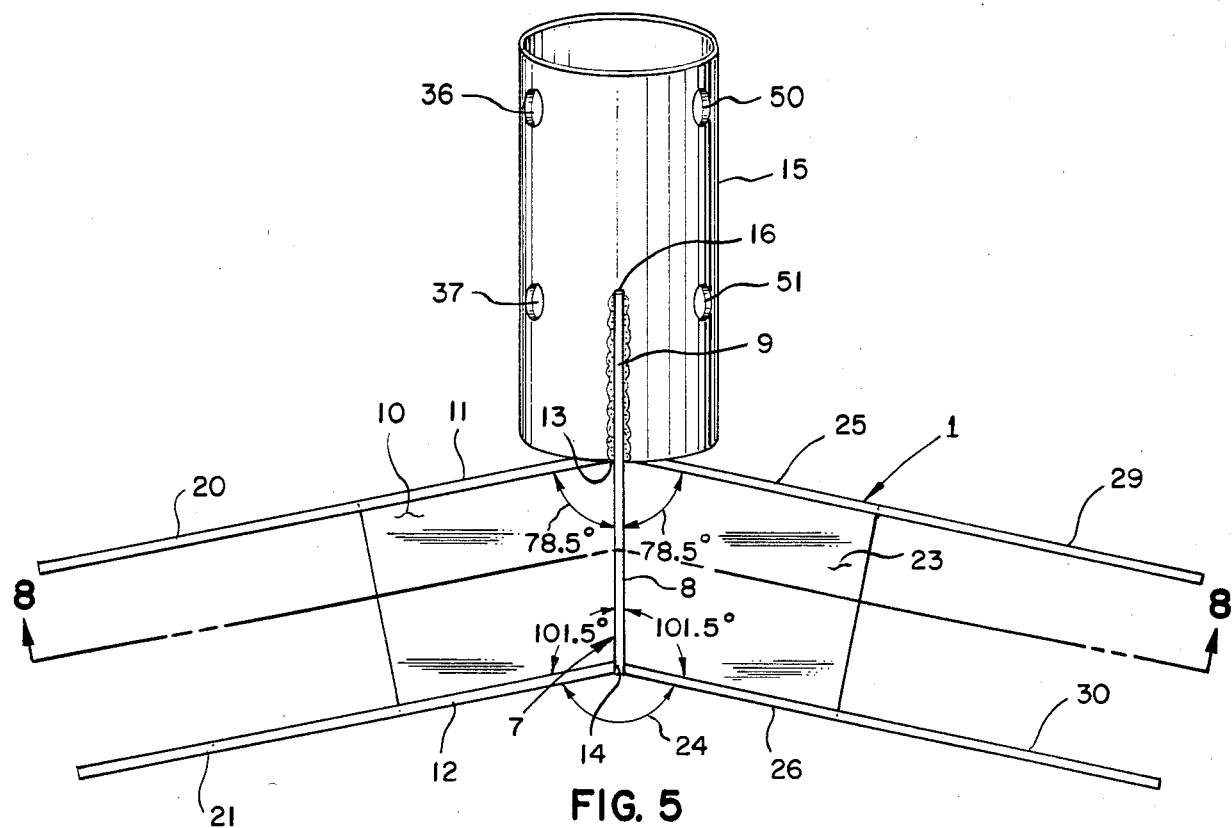
FIG. 5 is a top plan view of the ledger hanger shown in FIG. 1.
Figure 6:
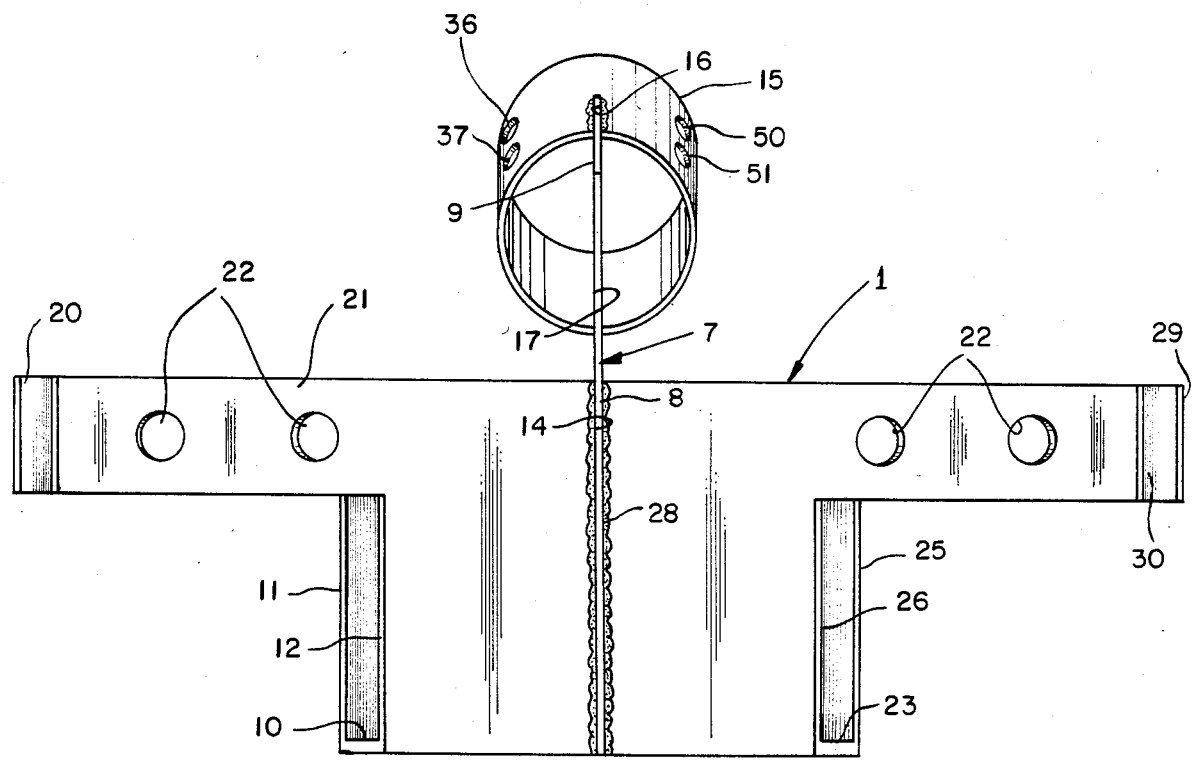
FIG. 6 is a front elevation view of the ledger hanger shown in FIG. 1.

To provide proper attachment, the pipe members should have at least two sets of openings and two pins. As shown in FIG. 5, additional openings 50 and 51 should be provided in pipe 15 for receipt of a pin 18 identical to the one shown in FIG. 2.

The spline member 7 may have various structural shapes. Most splines require a diagonal brace portion 48 to give the spline the necessary design strength to resist bending.

Figure 11:
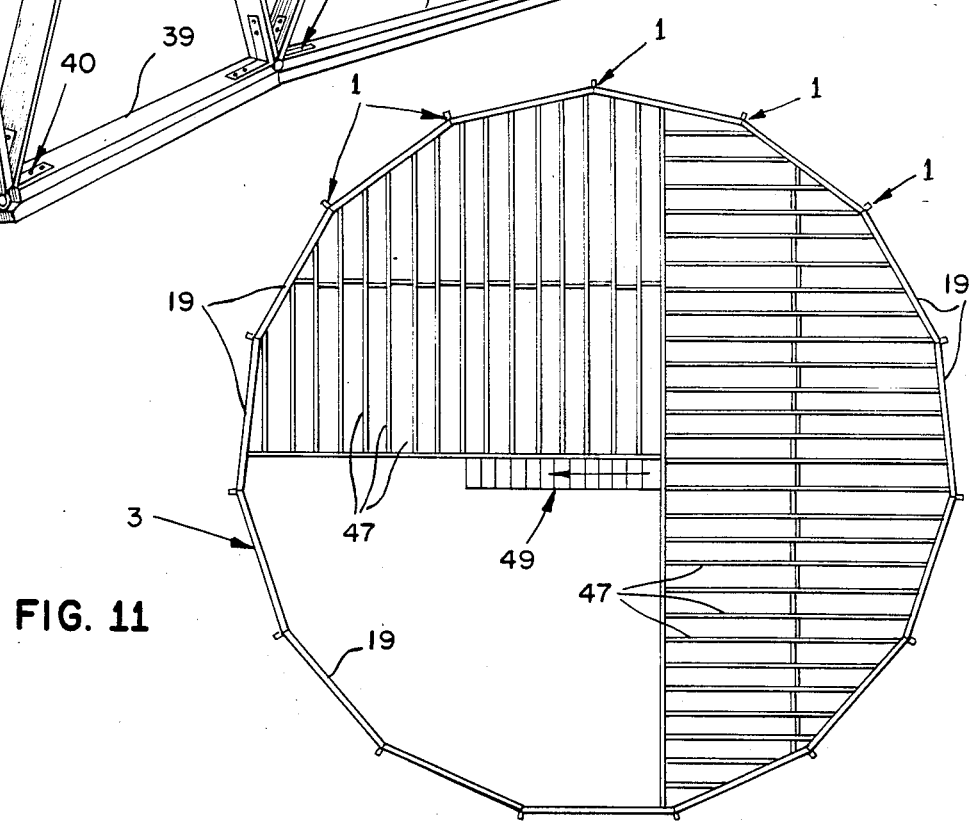
FIG. 11 is a sectional plan view of a portion of geodesic dome illustrating the use of the ledger hanger of the present invention in supporting a second floor.

FIG. 11 shows a typical dome floor plan showing a stairway 49 to a partial second floor with joist members 47 joined to joist hangers 46 attached to ledgers 19 as previously described.

Although not shown, it can be easily seen how the joist members 47, if laid on top of the ledger 19, can be extended through the walls of the dome to form a cantilevered deck around the outside of a dome. Heretofore, such a second story deck around the outside of a dome has been virtually impossible without extensive custom bracing or long posts for supporting the deck.

If ledger members are placed completely around the inside of the dome, no internal posts or load bearing walls are necessary to support the second floor joists.

We claim:

1. A pair of hangers for supporting a ledger member adjacent to the upstanding inwardly slanting sidewall forming the structural shell of a geodesic dome in combination with at least two spaced metal hub connectors positioned at approximately the same elevation and used in constructing said structural shell wall, said metal hub connectors being formed with an elongated hub having an elongated inner opening and said hub being connected to metal arms which are attached to wood strut members forming said structural shell wall for said geodesic dome, said hanger comprising:

a. a flange member having a hanger supporting portion and a hub connection portion projecting therefrom;
   b. a first hanger seat connected at a generally right angle to said hanger supporting portion of said flange for supporting an end of said ledger member;
   c. first hanger sidewall members extending from said first hanger seat and connected to said seat and said flange member;
   d. adaptor means connected to said hub connection portion of said flange member and releasably connected to said elongated hub of said hub connector within said elongated inner opening of said hub;

e. said adaptor means and said flange member dimensioned to position said hanger seat a selected distance from said structural shell to prevent interference of said ledger member and floor beam members with said inwardly slanting structural shell of said dome;

f. coupling means releasably coupling said adaptor means to said elongated hub of said hub connector;

g. first strap members connected to said first hanger sidewall members and extending outwardly therefrom and having bolt holes formed therein for receipt of bolts therethrough;

h. said bolts connect each end of said ledger member to said hangers thereby structurally stiffening said geodesic shell;

i. a second hanger seat connected to said hanger supporting portion of said flange member disposed on the opposite side of said flange member from said first hanger seat and disposed at an angle thereto;

j. second hanger sidewall members extending from said second hanger seat and connected to said second seat and said spline member;

k. second strap members connected to said second hanger sidewall members and extending outwardly therefrom and having bolt holes formed therein for receipt of bolts therethrough;

l. said bolts connect each end of said ledger member to said hangers;

m. said adaptor means includes a tubular cylinder connected to said flange member;

n. said coupling means consists of at least one U-shaped pin member formed with a substantially straight base member and two angularly related parallel legs having at least one threaded end and said base member having a length greater than the length of said elongated hub; and o. said tubular cylinder is formed with at least one pair of openings spaced for registered receipt of said legs of said U-shaped pin.

2. A hanger as described in claim 1 wherein:

a. said U-shaped pin is formed with a tongue projecting from one of said unthreaded ends of said legs of said U-shaped pin and disposed at an angle parallel to said base member of said pin.

* * * * *